2 Sheets--Sheet 1.

W. W. HUNTLEY & A. P. HOLCOMB.
Middlings Purifiers.

No. 135,810. Patented Feb. 11, 1873.

Witnesses.
A. Ruppert.
O. Bradford.

Wm. W. Huntley
A. P. Holcomb
Inventors

A. P. Holloway & Co
Attorneys

UNITED STATES PATENT OFFICE.

WILLIAM W. HUNTLEY AND ABEL P. HOLCOMB, OF SILVER CREEK, N. Y.

IMPROVEMENT IN MIDDLINGS-PURIFIERS.

Specification forming part of Letters Patent No. 135,810, dated February 11, 1873.

*To all whom it may concern:*

Figure 1:
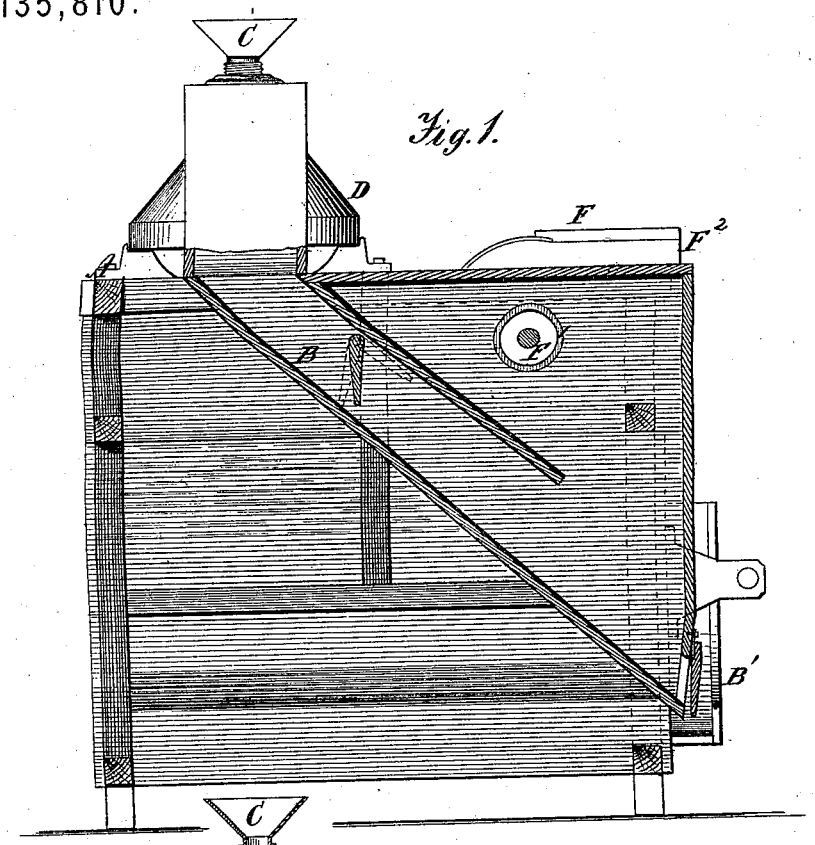
Figure 2:
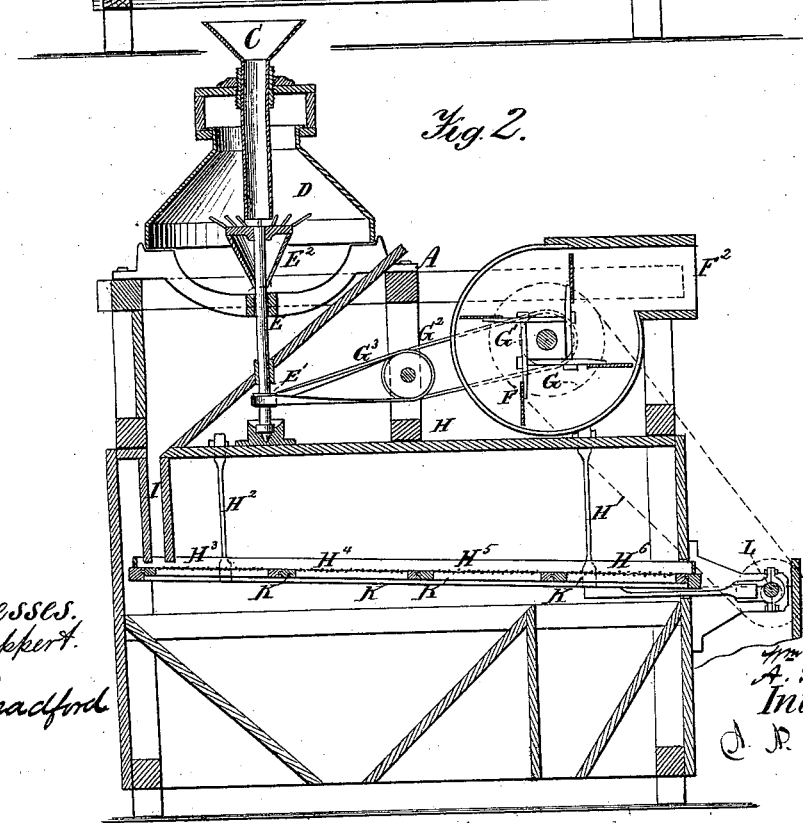

Be it known that we, WILLIAM W. HUNTLEY and ABEL P. HOLCOMB, residing at Silver Creek, in the county of Chautauqua and State of New York, have invented certain new and useful Improvements in Middlings-Purifiers, of which the following is a specification:

In the drawing, Figure 1 is a side elevation of our improved machine, showing the adjustable hopper, a portion of a fan-case, and the wind-trunk, the latter being shown in section, with its regulating-valve; Fig. 2, a sectional elevation on line $x$ $x$ of Fig. 3, showing the disintegrator, the fan, the discharge-spout, and the arrangement of the sieves, with the bolt and pulleys for moving them. Fig. 3 is a front elevation, partly in section, showing the arrangement of the feed-hopper; the disintegrator; the fan; the wind-trunk; the driving-pulley; the shaft for agitating the sieves; the belt for driving the same; and the discharge-spout.

Corresponding letters refer to corresponding parts in the several figures.

This invention relates to a machine for purifying middlings, which are a part of the products of ground wheat and other grains; and it consists in the construction, combination, and arrangement of some of the parts of which it is composed, as will be more fully explained hereinafter.

To enable those skilled in the art to make and use our improved machine, we will now proceed to describe it with reference to the drawing.

In constructing this type of machine we use any suitable frame-work, A, which is capable of receiving and supporting the moving parts, it being covered upon its outer surface with some suitable material, such as thin boards or sheet metal, in order that a vacuum or partial vacuum may be formed therein. Upon one of the sides of this frame there is secured a wind-trunk, B, the lower end of which extends down, as shown in Fig. 3, its lower end being furnished with a valve, B', as shown in Fig. 1, in order that when the machine is in operation air shall not rush in at that point, and in order that when a sufficient amount of material has been deposited in said trunk the valve may open and allow such material to pass out. This trunk extends upward in a vertical position to the upper surface of the frame, when it is inclined inward, and is extended upward at an angle until it has reached a point sufficiently high to admit of there being attached to its under surface a conical hood, when it is made to extend horizontally over and some distance past the center of the machine, or over that part thereof to which the vertical shaft which carries the disintegrator is placed. Within this trunk, and at about the point indicated in Fig. 1, there is placed a swinging valve, the stem or axle of which should be extended out through the side of the machine, in order that it may be set in different positions, and thus be made to regulate the passage of air through the trunk. To facilitate the feeding of the material to the machine, there is provided a hopper, C, the upper portion of which is funnel-formed, while the lower portion is cylindrical, and extends downward through the horizontal portion of the wind-trunk, so as to conduct the material to be operated upon to the disintegrator. Upon the outer surface of the cylindrical portion of this hopper there is formed a screw-thread, $C^1$, which is provided with a nut, $C^2$, which rests upon the upper surface of the wind-trunk, the arrangement being such that the hopper can be raised or lowered at pleasure, to regulate the feed of material to the machine. Upon the under side of the wind-trunk, and surrounding the lower portion of the feed-hopper, there is secured a hood, D, which is in the form shown, for the purpose of allowing the disintegrator to revolve within it, and for the further purpose of allowing a current of air to pass up through it and into the wind-trunk, for the purpose of taking away from the middlings any specks of dirt, smut, or other foreign substance which the disintegrator may have beaten loose from that portion thereof which it is desirable to regrind, such specks, dirt, and other foreign substances being carried into the trunk B, and, at proper intervals of time, delivered out through the valve B'. Directly under the feed-hopper there is located a vertical shaft, E, the lower end of which is placed in a suitable stop for it to rotate in, and a short distance above which there is placed a pulley, $E^1$, around which passes a belt for giving motion to said shaft, its upper end being supported by suitable boxes at-

UNITED STATES PATENT OFFICE.

WILLIAM W. HUNTLEY AND ABEL P. HOLCOMB, OF SILVER CREEK, N. Y.

IMPROVEMENT IN MIDDLINGS-PURIFIERS.

Specification forming part of Letters Patent No. 135,810, dated February 11, 1873.

*To all whom it may concern:*

Be it known that we, WILLIAM W. HUNTLEY and ABEL P. HOLCOMB, residing at Silver Creek, in the county of Chautauqua and State of New York, have invented certain new and useful Improvements in Middlings-Purifiers, of which the following is a specification:

In the drawing, Figure 1 is a side elevation of our improved machine, showing the adjustable hopper, a portion of a fan-case, and the wind-trunk, the latter being shown in section, with its regulating-valve; Fig. 2, a sectional elevation on line $x$ $x$ of Fig. 3, showing the disintegrator, the fan, the discharge-spout, and the arrangement of the sieves, with the bolt and pulleys for moving them. Fig. 3 is a front elevation, partly in section, showing the arrangement of the feed-hopper; the disintegrator; the fan; the wind-trunk; the driving-pulley; the shaft for agitating the sieves; the belt for driving the same; and the discharge-spout.

Corresponding letters refer to corresponding parts in the several figures.

This invention relates to a machine for purifying middlings, which are a part of the products of ground wheat and other grains; and it consists in the construction, combination, and arrangement of some of the parts of which it is composed, as will be more fully explained hereinafter.

To enable those skilled in the art to make and use our improved machine, we will now proceed to describe it with reference to the drawing.

In constructing this type of machine we use any suitable frame-work, A, which is capable of receiving and supporting the moving parts, it being covered upon its outer surface with some suitable material, such as thin boards or sheet metal, in order that a vacuum or partial vacuum may be formed therein. Upon one of the sides of this frame there is secured a wind-trunk, B, the lower end of which extends down, as shown in Fig. 3, its lower end being furnished with a valve, B', as shown in Fig. 1, in order that when the machine is in operation air shall not rush in at that point, and in order that when a sufficient amount of material has been deposited in said trunk the valve may open and allow such material to pass out. This trunk extends upward in a vertical position to the upper surface of the frame, when it is inclined inward, and is extended upward at an angle until it has reached a point sufficiently high to admit of there being attached to its under surface a conical hood, when it is made to extend horizontally over and some distance past the center of the machine, or over that part thereof to which the vertical shaft which carries the disintegrator is placed. Within this trunk, and at about the point indicated in Fig. 1, there is placed a swinging valve, the stem or axle of which should be extended out through the side of the machine, in order that it may be set in different positions, and thus be made to regulate the passage of air through the trunk. To facilitate the feeding of the material to the machine, there is provided a hopper, C, the upper portion of which is funnel-formed, while the lower portion is cylindrical, and extends downward through the horizontal portion of the wind-trunk, so as to conduct the material to be operated upon to the disintegrator. Upon the outer surface of the cylindrical portion of this hopper there is formed a screw-thread, $C^1$, which is provided with a nut, $C^2$, which rests upon the upper surface of the wind-trunk, the arrangement being such that the hopper can be raised or lowered at pleasure, to regulate the feed of material to the machine. Upon the under side of the wind-trunk, and surrounding the lower portion of the feed-hopper, there is secured a hood, D, which is in the form shown, for the purpose of allowing the disintegrator to revolve within it, and for the further purpose of allowing a current of air to pass up through it and into the wind-trunk, for the purpose of taking away from the middlings any specks of dirt, smut, or other foreign substance which the disintegrator may have beaten loose from that portion thereof which it is desirable to regrind, such specks, dirt, and other foreign substances being carried into the trunk B, and, at proper intervals of time, delivered out through the valve B'. Directly under the feed-hopper there is located a vertical shaft, E, the lower end of which is placed in a suitable stop for it to rotate in, and a short distance above which there is placed a pulley, $E^1$, around which passes a belt for giving motion to said shaft, its upper end being supported by suitable boxes attached to the frame of the machine. Upon the upper end of shaft E there is secured an inverted cone, or it may be a disk of metal, $E^2$, its office being to receive and hold a series of pins or beaters, which cone or disk and pins have been denominated a disintegrator, because its office is to disengage the particles of dirt which adhere to the coarser portions of the meal and allow them to be carried away to the wind-trunk, while the valuable parts are allowed to fall down upon an inclined surface, and be conducted to a set of sieves, soon to be described, when a further separation takes place. The air or wind current above alluded to is produced by a fan, F, which is placed within frame A of the machine, and is so arranged that when rotated in the proper direction any air which may be within the inclosed portion of the machine will be drawn into said fan through its central opening $F^1$, and expelled through its outlet $F^2$, thus inducing the air from the outside to flow in through the hood D, and into the trunk B, as above described. The shaft of this fan has its bearings in boxes attached to the frame of the machine, and is provided with a driving-pulley, $F^3$, which may receive its motion from any prime mover. Upon the outer end of the fan-shaft there is placed a pulley, G, for driving a shaft which gives motion to the sieves, and also one, $G^1$, which gives motion to the disintegrator by a system of belts, such as are shown in Fig. 2, or in any other suitable manner, the belts being marked $G^2$ and $G^3$. Extending nearly the entire length of the machine there is a partition, H, which serves as a support for the step of shaft E, and also for the hangers $H^1$ $H^2$ of a series of sieves, $H^3$ $H^4$ $H^5$ $H^6$, into which the parts of the middlings not carried off through the wind-trunk are delivered through the spout or passage I. The sieves referred to are made of what is termed bolting-cloth, and of different numbers of such cloth, or of cloth of different degrees of fineness of mesh, in order that the material delivered upon them may be properly separated, the coarser and harder portions of the meal, as above described, passing through the sieves, while any foreign matter that may fall thereon will be, by the movement of such sieves, carried over the end thereof, and delivered into a spout below. The manner of constructing these sieves is as follows: A frame, K, of wood or other suitable material, of sufficient size to receive the sieves, is provided, and is suspended upon hangers $H^1$ $H^2$, so that it may have an oscillating or shaking movement imparted to it by means of cam-shaped formations upon a shaft, L, which is provided with a pulley, L', which receives its motion from a belt which passes over pulley G upon the fan-shaft, as shown in Fig. 3. To the cam-shaped formations upon shaft L straps are attached by bolts, as shown in Fig. 2, to which springs are fastened, their opposite ends being secured to the frame K, so that when said shaft is rotated the motion above described is imparted to said frame.

The relative construction of the frame K and the series of sieves is preferably that described in the specification of the pending application of Wm. W. Huntley for an improved bolt or sieve.

From the above description it will be seen that the most valuable parts of the kernels of wheat in the process of grinding and bolting now in general use are allowed to be deposited in the receptacle provided for what is termed middlings, and that by the use of our improved machine such valuable portions are separated from all the foreign substances which have heretofore rendered them nearly worthless, and prepared for regrinding and for being converted into the very best quality of flour, which shall command the highest prices of any in the market, instead of being sold, as it now is, for the lowest price.

Having thus described our invention, what we claim, and desire to secure by Letters Patent, is—

1. In a machine for purifying middlings, the combination of the disintegrating-head, an exhaust-fan, and a wind-trunk, when constructed substantially as described, and for the purpose set forth.

2. The combination of the hood D, the feed-hopper C, wind-trunk B, and fan F, when constructed and arranged to operate substantially as and for the purpose set forth.

3. The combination, in a machine for purifying middlings, of a disintegrator and a suitable series of sieves, the parts being constructed and arranged to operate with reference to each other substantially as set forth.

In testimony whereof we have signed our names to this specification in the presence of two subscribing witnesses.

WILLIAM W. HUNTLEY.
ABEL P. HOLCOMB.

Witnesses:
G. W. TEW,
THOS. STEWART.